UNITED STATES PATENT OFFICE.

ARMIN GROB AND JAKOB WÜRGLER, OF BASEL, SWITZERLAND, ASSIGNORS TO SOCIETY OF CHEMICAL INDUSTRY IN BASLE, OF BASEL, SWITZERLAND.

PROCESS FOR THE MANUFACTURE OF CHLORINATED DERIVATIVES OF THE N-DIHYDRO-1.2.2'.1'.-ANTHRAQUINONAZIN.

1,317,160.  Specification of Letters Patent.  Patented Sept. 30, 1919.

No Drawing.  Application filed February 7, 1918. Serial No. 215,840.

*To all whom it may concern:*

Be it known that we, ARMIN GROB and JAKOB WÜRGLER, both citizens of the Swiss Republic, and residents of Basel, Switzerland, have invented a new and useful Process for the Manufacture of Chlorinated Derivatives of the N-Dihydro-1.2.2'.1'-Anthraquinonazin, of which the following is a full, clear, and exact specification.

We have found that by thorough treatment of N-dihydro-1.2.2'.1'-anthraquinonazin with chlorin in presence of a non aqueous, inorganic liquid halogen compound other than chlorosulfonic acid, as for instance sulfuryl chlorid, thionylchlorid, sulfur chlorid, phosphorus oxychlorid, antimony pentachlorid, bromin, etc., tri- and tetrachloro derivatives of N-dihydro-1.2.2'.1'-anthraquinonazin are obtained which are capable of being transformed easily into an alkaline vat and giving dyeings and printings perfectly fast to chlorin in contradistinction to the low halogenated N-dihydro-1.2.2'.1'-anthraquinonazin of the U. S. Letters Patent No. 739579, which gives dyeings only fast to a certain extent to feeble chlorin lyes. Hereby a large chlorination in the said liquids, which are by no means indifferent, is not at all dependent on temperatures essential in the employment of indifferent organic diluents, as is the case in certain known processes. The chlorination can be effected with the same excellent result in boiling sulfurylchlorid or phosphorus oxychlorid or in sulfurylchlorid or phosphorus oxychlorid cooled down with ice. The action of sulfuryl chlorid alone on N-dihydro-1.2.2'.1'-anthraquinonazin at corresponding temperatures, according to known processes gives only a low chlorinated product, which furnishes dyeings of a lower fastness to chlorin than those obtained with the products obtained according to the present invention.

More highly chlorinated derivatives or derivatives more fast to chlorin are obtained, according to known processes, with sulfuryl chlorid alone only by working at essentially higher temperatures (about 170° C.) and under pressure.

Relative to this process that of the present invention has the obvious advantage that it can be carried out in an open vessel and gives hereby products still more highly chlorinated or more fast to chlorin. The same inconvenience occurs, when another of the above specified non aqueous, inorganic liquid halogen compounds, as sulfur chlorid, antimony pentachlorid or thionyl chlorid, is employed as chlorinating agent.

The action of the non aqueous inorganic liquid halogen compounds, which are employed in the present process only as suspending agents, is the more surprising as in the inorganic agents hitherto generally employed for halogenations, as for instance concentrated sulfuric acid and chlorosulfonic acid, the N-dihydro-1.2.2'.1'-anthraquinonazin was only oxidized by chlorin to the corresponding azin, while N-dihydro-1.2.2'.1'-anthraquinonazin was not chlorinated or only insufficiently chlorinated by chlorin, in aqueous suspending agents, as hydrochloric acid, dilute sulfuric acid or water, or when distributed in dry state on a large surface.

Concerning the employment of liquid bromin as suspending agent, it is to be observed that when N-dihydro-1.2.2'.1'-anthraquinonazin is suspended for a long time at ordinary temperatures in liquid bromin, there results a bromin derivative which is fast to chlorin, but is very difficult to transform into a vat and is therefore hardly applicable for dyeing purposes, while by passing a current of chlorin through a suspension of N-dihydro-1.2.2'.1'-anthraquinonazin in liquid bromin, the former is transformed in a surprising manner into a poly-chlorinated substitution product, free of bromin, which can be transformed easily into a vat and gives dyeings fast to chlorin.

The invention is illustrated by the following examples:

Example 1: 5 parts of finely divided N-dihydro-1.2.2'.1'-anthraquinonazin are suspended in 20 parts of sulfurylchlorid and hereafter a current of dry chlorin is passed through the suspension for seven hours, while cooling with ice. The originally blue coloration of the dyestuff turns hereby, in consequence of a partial oxidation to the azin, to gray to yellow-green. The sulfurylchlorid is separated from the chlorinated derivative formed by filtration or distillation and can be employed again. The chlorinated dyestuff gives in an alkaline vat the dyeings which are more reddish than those obtained with the dichlor derivative known as indanthrene blue G C D.

Example 2: 5 parts of N-dihydro-1.2.2'.1'-anthraquinonazin are boiled with 25 parts of sulfurylchlorid for 6 to 8 hours while a current of chlorin is passed through the mass. The new chlorinated dyestuff is isolated from the mass of reaction in the manner indicated in example 1.

Example 3: 6 parts of the chloro derivative obtained by boiling N-dihydro-1.2.2'.1'-anthraquinonazin with sulfurylchlorid in a benzene suspension, are treated with an excess of chlorin in 20 parts boiling phosphorus oxychlorid for 7 hours in a vessel provided with a reflux cooler. From the mass of reaction the chlorinated dyestuff is isolated in the manner indicated in example 1.

Example 4: 5 parts of N-dihydro-1.2.2'.1'-anthraquinonazin are suspended in 30 parts bromin and through the suspension thus obtained a current of chlorin is passed, at ordinary temperature (about 15 to 20° C.) for 7 hours. The bromin is separated by filtration from the chlorinated dyestuff.

What we claim is:

1. The herein described process for the manufacture of chlorinated derivatives of N-dihydro-1.2.2'.1'-anthraquinonazin consisting in acting with an excess of chlorin on N-dihydro-1.2.2'.1'-anthraquinonazin suspended in an inorganic, non aqueous, liquid halogen compound other than chlorosulfonic acid.

2. The herein described process for the manufacture of chlorinated derivatives of N-dihydro-1.2.2'.1'-anthraquinonazin consisting in acting with an excess of chlorin on N-dihydro-1.2.2'.1'-anthraquinonazin suspended in sulfuryl chlorid.

In witness whereof we have hereunto signed our names this fourth day of January, 1918, in the presence of two subscribing witnesses.

ARMIN GROB.
JAKOB WÜRGLER.

Witnesses:
H. H. DICK,
AMAND RITTER.